United States Patent
Yang et al.

(10) Patent No.: US 11,321,891 B2
(45) Date of Patent: May 3, 2022

(54) METHOD FOR GENERATING ACTION ACCORDING TO AUDIO SIGNAL AND ELECTRONIC DEVICE

(71) Applicant: HTC Corporation, Taoyuan (TW)

(72) Inventors: Tung-Ting Yang, Taoyuan (TW); Chun-Li Wang, Taoyuan (TW); Yao-Chen Kuo, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 260 days.

(21) Appl. No.: 16/861,229

(22) Filed: Apr. 29, 2020

(65) Prior Publication Data

US 2021/0343058 A1 Nov. 4, 2021

(51) Int. Cl.
| G06T 13/20 | (2011.01) |
| G06T 13/40 | (2011.01) |
| G10L 25/30 | (2013.01) |
| G10H 1/00 | (2006.01) |
| G06N 3/08 | (2006.01) |
| G10L 25/51 | (2013.01) |

(52) U.S. Cl.
CPC ............ *G06T 13/205* (2013.01); *G06N 3/08* (2013.01); *G06T 13/40* (2013.01); *G10H 1/0008* (2013.01); *G10L 25/30* (2013.01); *G10L 25/51* (2013.01); *G10H 2210/076* (2013.01)

(58) Field of Classification Search
CPC .......... G06T 13/205; G06T 13/40; G06N 3/08
See application file for complete search history.

(56) References Cited

U.S. PATENT DOCUMENTS

| 9,358,456 B1 * | 6/2016 | Challinor ............... A63F 13/44 |
| 2003/0179204 A1 * | 9/2003 | Mochizuki .............. G06T 13/40 345/473 |
| 2003/0227453 A1 * | 12/2003 | Beier .................. A63B 71/0622 345/473 |
| 2008/0309664 A1 * | 12/2008 | Zhou ...................... G06T 13/40 345/420 |
| 2010/0302253 A1 * | 12/2010 | Kipman .................. G06T 13/40 345/473 |

(Continued)

FOREIGN PATENT DOCUMENTS

| TW | 201935408 | 9/2019 |
| WO | 2019217419 | 11/2019 |

OTHER PUBLICATIONS

"Office Action of Taiwan Counterpart Application", dated Jun. 8, 2021, p. 1-p. 5.

*Primary Examiner* — David T Welch
(74) *Attorney, Agent, or Firm* — JCIPRNET

(57) ABSTRACT

The disclosure provides a method for generating action according to an audio signal and an electronic device. The method includes: receiving an audio signal and extracting a high-level audio feature therefrom; extracting a latent audio feature from the high-level audio feature; in response to determining that the audio signal corresponds to a beat, obtaining a joint angle distribution matrix based on the latent audio feature; in response to determining that the audio signal corresponds to a music, obtaining a plurality of designated joint angles corresponding to a plurality of joint points based on the joint angle distribution matrix; and adjusting a joint angle of each of the joint points on the avatar according to the designated joint angles.

23 Claims, 7 Drawing Sheets

(56) References Cited

U.S. PATENT DOCUMENTS

| | | | |
|---|---|---|---|
| 2011/0306398 A1* | 12/2011 | Boch | A63F 13/52 |
| | | | 463/7 |
| 2013/0176442 A1* | 7/2013 | Shuster | G06T 11/60 |
| | | | 348/207.1 |
| 2013/0215116 A1* | 8/2013 | Siddique | G06Q 20/40 |
| | | | 705/26.7 |
| 2016/0026253 A1* | 1/2016 | Bradski | H04N 13/128 |
| | | | 345/8 |
| 2016/0210602 A1* | 7/2016 | Siddique | G06Q 20/384 |
| 2016/0338644 A1 | 11/2016 | Connor | |
| 2018/0020951 A1 | 1/2018 | Kaifosh et al. | |
| 2018/0214777 A1* | 8/2018 | Hingorani | A63F 13/5255 |
| 2019/0094981 A1* | 3/2019 | Bradski | G06F 3/017 |
| 2019/0155386 A1* | 5/2019 | Tadi | G06K 9/0051 |
| 2019/0304157 A1* | 10/2019 | Amer | G06V 20/41 |
| 2019/0362529 A1* | 11/2019 | Wedig | G06T 13/40 |
| 2019/0371031 A1* | 12/2019 | Callegari | G06T 13/40 |
| 2022/0026920 A1* | 1/2022 | Ebrahimi Afrouzi | |
| | | | B25J 13/087 |

* cited by examiner

METHOD FOR GENERATING ACTION ACCORDING TO AUDIO SIGNAL AND ELECTRONIC DEVICE

TECHNICAL FIELD

The disclosure relates to a technique for controlling avatar, and more particularly, to a method for generating action according to audio signal and an electronic device.

BACKGROUND

In virtual reality (VR) and augmented reality (AR) experiences, avatars are a key part of these applications. If the avatars can have the same perceptual ability and sensation as the user and can respond accordingly to the environment, the user's immersion will be greatly improved.

In the prior art, there is a technique that enables an avatar to dance to music. However, in order to achieve the above purpose and generate dance moves, this technique needs to maintain a database storing a large number of preset dance moves, which has high memory usage and thus not easy to be implemented on application of edge devices (e.g., embedded systems or mobile devices).

Further, when music comes in VR/AR environment, said technique will select one or more dance moves from the database based on certain predetermined hand-crafted features, and recombine these dance moves into a series of dance moves corresponding to the current music. Consequently, said technique is unable to make the avatar dance creatively.

SUMMARY

Accordingly, the disclosure proposes a method for generating action according to audio signal and an electronic device, which are capable of solving the technical problem described above.

The disclosure provides a method for generating action according to audio signal, including: receiving a first audio signal and extracting a first high-level audio feature from the first audio signal; extracting a first latent audio feature from the first high-level audio feature; in response to determining that the first latent audio feature indicates that the first audio signal corresponds to a first beat, obtaining a first joint angle distribution matrix according to the first latent audio feature, wherein the first joint angle distribution matrix comprises a plurality of Gaussian distribution parameters, and the Gaussian distribution parameters correspond to a plurality of joint points on an avatar; in response to determining that the first latent audio feature indicates that the first audio signal corresponds to a first music, obtaining a plurality of designated joint angles corresponding to the joint points based on the first joint angle distribution matrix; and adjusting a joint angle of each of the joint points on the avatar according to the designated joint angles.

The disclosure provides an electronic device, which includes a storage circuit and a processor. The storage unit stores a plurality of modules. The processor is coupled to the storage circuit, and accesses the modules to execute steps of: receiving a first audio signal and extracting a first high-level audio feature from the first audio signal; extracting a first latent audio feature from the first high-level audio feature; in response to determining that the first latent audio feature indicates that the first audio signal corresponds to a first beat, obtaining a first joint angle distribution matrix according to the first latent audio feature, wherein the first joint angle distribution matrix comprises a plurality of Gaussian distribution parameters, and the Gaussian distribution parameters correspond to a plurality of joint points on an avatar; in response to determining that the first latent audio feature indicates that the first audio signal corresponds to a first music, obtaining a plurality of designated joint angles corresponding to the joint points based on the first joint angle distribution matrix; and adjusting a joint angle of each of the joint points on the avatar according to the designated joint angles.

Based on the above, the method of the disclosure allows the avatar to improvise corresponding actions (e.g., dance steps) based on the current music without maintaining a dance step database, and is therefore suitable for being applied to electronic devices implemented as edge devices.

DETAILED DESCRIPTION

Figure 1:
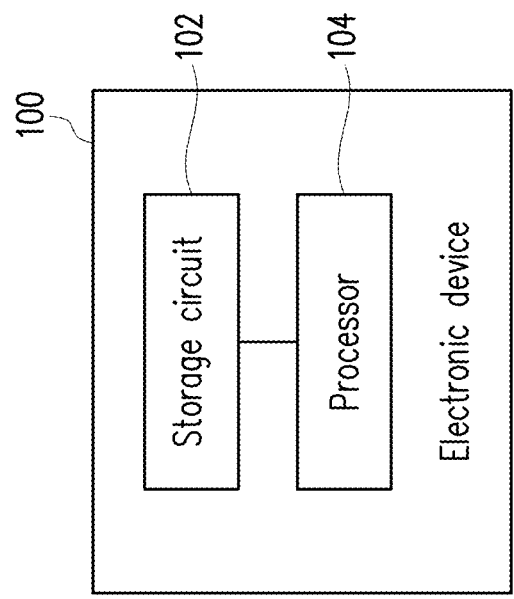
FIG. 1 is a schematic diagram of an electronic device illustrated according one embodiment of the disclosure.

Referring to FIG. 1, FIG. 1 is a schematic diagram of an electronic device illustrated according one embodiment of the disclosure. In different embodiments, an electronic device 100 is, for example, a device that can provide AR/VR or other similar services, such as a computer device, an embedded system, a mobile device or the like, but not limit thereto. As shown by FIG. 1, the electronic device 100 includes a storage circuit 102 and a processor 104.

The storage circuit 102 is, for example, any forms of fixed or movable random access memory (RAM), read only memory (ROM), flash memory, hard disk or other similar devices, or a combination of above-said devices, which can be used to record a plurality of program codes or modules.

The processor 104 is coupled to the storage circuit 102, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the embodiments of the disclosure, the processor 104 can access the modules and the program codes recorded in the storage circuit 102 to realize the method for generating action according to audio signal proposed by the disclosure.

Figure 2:
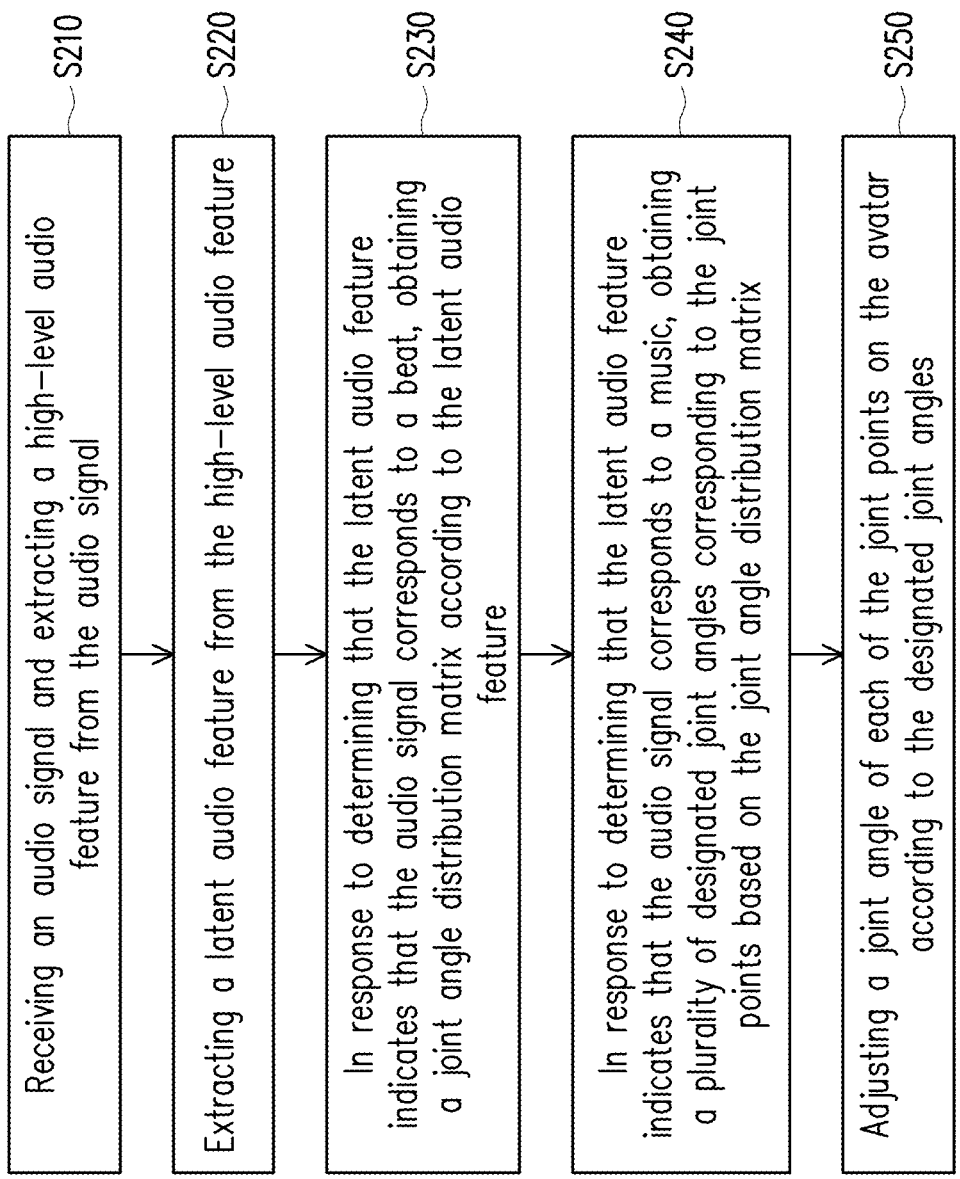
FIG. 2 is a flowchart of a method for generating action according to audio signal illustrated according to one embodiment of the disclosure.

Referring to FIG. 2, FIG. 2 is a flowchart of a method for generating action according to audio signal illustrated according to one embodiment of the disclosure. The method of this embodiment may be executed by the electronic device 100 of FIG. 1, and details of each step of FIG. 2 are described below with reference to each element shown in FIG. 1. In addition, to make the content of this application easier to understand, the following description will be discussed in accompanying with the system architecture diagram shown in FIG. 3, but it is used only as an example and is not intended to limit the possible implementations of the disclosure.

In brief, when an audio signal (e.g., an audio frame) is received, the method of the disclosure may be used to accordingly determine a joint angle of each joint on an avatar in each dimension so the avatar can present appropriate actions. In different embodiments, the audio signal may come from any kind of sound, such as music, ambient sound, voice and the like, but not limited thereto.

Figure 3:
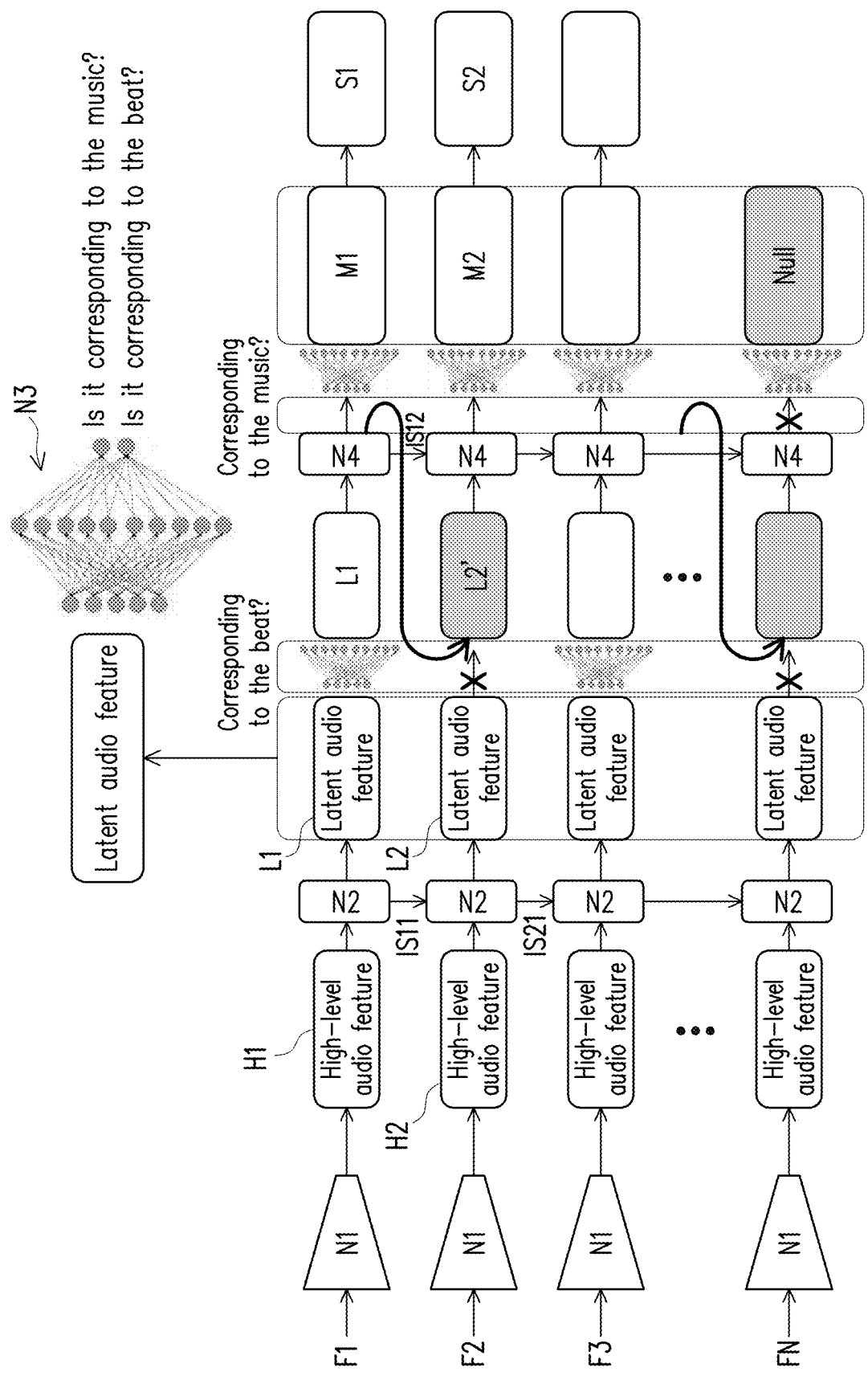
FIG. 3 is a system architecture diagram illustrated according to one embodiment of the disclosure.

In FIG. 3, audio signals F1 to FN are, for example, a plurality of consecutive audio frames. The processor 104 may perform a similar process for each of the audio signals F1 to FN to generate an avatar action corresponding to the considered audio signal. For illustrative convenience, the audio signal F1 is used as an example for explanation, but it is not intended to limit the possible implementations of the disclosure.

First of all, in step S210, the processor 104 may receive the audio signal F1 and extract a high-level audio feature H1 from the audio signal F1. In one embodiment, the audio signal F1 may include an audio frame, which may be expressed as a vector (or array) having a specific dimension (e.g., 2048×1), but not limited thereto. In one embodiment, the processor 104 may input the audio frame to a convolutional neural network (CNN) N1 for the CNN N1 to extract the high-level audio feature H1 from the audio frame. In one embodiment of the disclosure, the CNN N1 may include one or more convolution layers for extracting the corresponding high-level audio feature from the received audio frame, but not limited thereto. For technical details about how the CNN N1 extracts the high-level audio feature H1, reference can be made to relevant literatures in the related art, and details regarding the same are not repeated herein.

Then, in step S220, the processor 104 may extract a latent audio feature L1 from the high-level audio feature H1. In one embodiment, the processor 104 may input the high-level audio feature H1 to a first recurrent neural network (RNN) N2 for the first RNN N2 to extract the latent audio feature L1 from the high-level audio feature H1. For technical details about how the first RNN N2 extracts the latent audio feature L1, reference can be made to relevant literatures in the related art, and details regarding the same are not repeated herein.

Further, in this embodiment, besides outputting the latent audio feature L1 based on the high-level audio feature H1, the first RNN N2 may also output a first internal state IS11. For details regarding the same, reference can be made to relevant technical documents for RNN, and details regarding the same are not repeated herein. In one embodiment of the disclosure, the first RNN N2 may include a multi-stack structure for extracting the corresponding latent audio feature from the received high-level audio feature, but not limited thereto.

Further, in one embodiment, the first internal state IS11 may allow the first RNN N2 to further generate a corresponding latent audio feature L2 according to the high-level audio feature H1 of the previous stage when processing a high-level audio feature H2 corresponding to the next audio signal F2. Details regarding the above will be described later.

In one embodiment, the processor 104 may determine whether the audio signal F1 corresponds to a beat (i.e., whether it is on beat) based on the latent audio feature L1, and determine whether the audio signal F1 corresponds to a music based on the latent audio feature L1. In one embodiment of the disclosure, the processor 104 may input the latent audio feature L1 to a specific neural network (which is composed of a plurality of fully-connected layers, for example) N3 for the specific neural network N3 to determine whether the audio signal F1 corresponds to the beat and corresponds to the music based on the latent audio feature L1, but not limited thereto.

For illustrative convenience, it is assumed that the audio signal F1 corresponds to the beat and corresponds to the music (i.e., the audio signal F1 is not noise, human voice, or other non-musical sounds). Accordingly, in step S230, in response to determining that the latent audio feature L1 indicates that the audio signal F1 corresponds to the beat, the processor 104 may obtain a joint angle distribution matrix M1 according to the latent audio feature L1. Here, the joint angle distribution matrix M1 may include a plurality of Gaussian distribution parameters, and the Gaussian distribution parameters may correspond to a plurality of joint points on an avatar. In one embodiment, the processor 104 may input the latent audio feature L1 to a second RNN N4 for the second RNN N4 to generate the joint angle distribution matrix M1 based on the latent audio feature L1. In addition, the second RNN N4 may also generate a second internal state IS12 based on the latent audio feature L1.

In one embodiment, the avatar is, for example, a character configured to dance with music in an AR/VR environment. Further, according to the relevant specification of biovision hierarchy (BVH), one avatar may be defined with an absolute position at a hip joint point (which may be represented by x, y, and z) and 52 other joint points. The 52 other joint points may be individually represented by a group of joint rotation angles in 3-dimensional space, such as (Rx, Ry, and Rz). For instance, for a first joint point on the avatar, the corresponding Rx, Ry, and Rz are, for example, joint angles in a first dimension (e.g., the X axis), a second dimension (e.g., the Y axis) and a third dimension (e.g., the Z axis), but not limited thereto.

To facilitate the explanation of the concept of the disclosure, it is assumed that the joint points on the considered avatar may include the hip joint point and the 52 other joint points described above, but the disclosure is not limited thereto. In addition, it is also assumed that an action of the considered avatar may be defined based on the relevant specifications of BVH, but the disclosure is not limited thereto. In this case, the action of the avatar may be determined according to a BVH motion capture data file. In one embodiment, one BVH motion capture data file may include 159 values, which are respectively corresponding to the absolute position of the hip joint point (i.e., x, y, and z) and (Rx, Ry, and Rz) of each of the 52 other joint points. Therefore, after the BVH motion capture data file is obtained, the action of the avatar can be determined accordingly. In the disclosure, the 159 values in the BVH motion capture data file may be determined based on the generated joint angle distribution matrix M1 so that the action of the avatar may then be determined.

Specifically, in the first embodiment, the joint angle distribution matrix M1 may be implemented as a matrix having a dimension of 159×2 in which 159 rows are respectively corresponding to x, y, and z and the (RX, Ry, and Rz) of each of the 52 other joint points described above. For instance, it is assumed that one specific joint point (hereinafter, referred to as a first joint point) on the avatar has a first movable angle range in the first dimension (which may be understood as a movable angle range corresponding to Rx of the first joint point), and this first movable angle range may be modeled as a first Gaussian distribution model in the disclosure. In this case, the row corresponding to Rx of the first joint point in the joint angle distribution matrix M1 may include 2 elements, and these 2 elements may be an expected value (represented by μ) and a standard deviation (represented by a) of the first Gaussian distribution model, respectively. As another example, it is assumed that the first joint point has another movable angle range in the second dimension (which may be understood as a movable angle range corresponding to Ry of the first joint point), and this another movable angle range may be modeled as another Gaussian distribution model in the disclosure. In this case, the row corresponding to Ry of the first joint point in the joint angle distribution matrix M1 may include 2 elements, and these 2 elements may be an expected value and a standard deviation of the another Gaussian distribution model, respectively.

Based on the teachings above, persons with ordinary skill in the art should be able to understand the meaning and content of the rest of rows in the joint angle distribution matrix M1, and details regarding the same are not repeated herein. Further, in the first embodiment, the first column of the joint angle distribution matrix M1 may be composed of, for example, the expected value in each row, and the second column of the joint angle distribution matrix M1 may be composed of, for example, the standard deviation in each row. However, the disclosure is not limited in this regard.

After obtaining the joint angle distribution matrix M1, in step S240, in response to determining that the latent audio feature L1 indicates that the audio signal F1 corresponds to a music, the processor 104 may obtain a plurality of designated joint angles corresponding to the joint points based on the joint angle distribution matrix M1.

With the first joint point taken as an example again, if the processor 104 intends to obtain a first designated joint angle of the first joint point in the first dimension, the processor 104 may sample a first angle within the first movable angle range based on the first Gaussian distribution model to be the first designated joint angle of the first joint point in the first dimension. For ease of understanding, the following description will be introduced in accompanying with FIG. 4.

Figure 4:
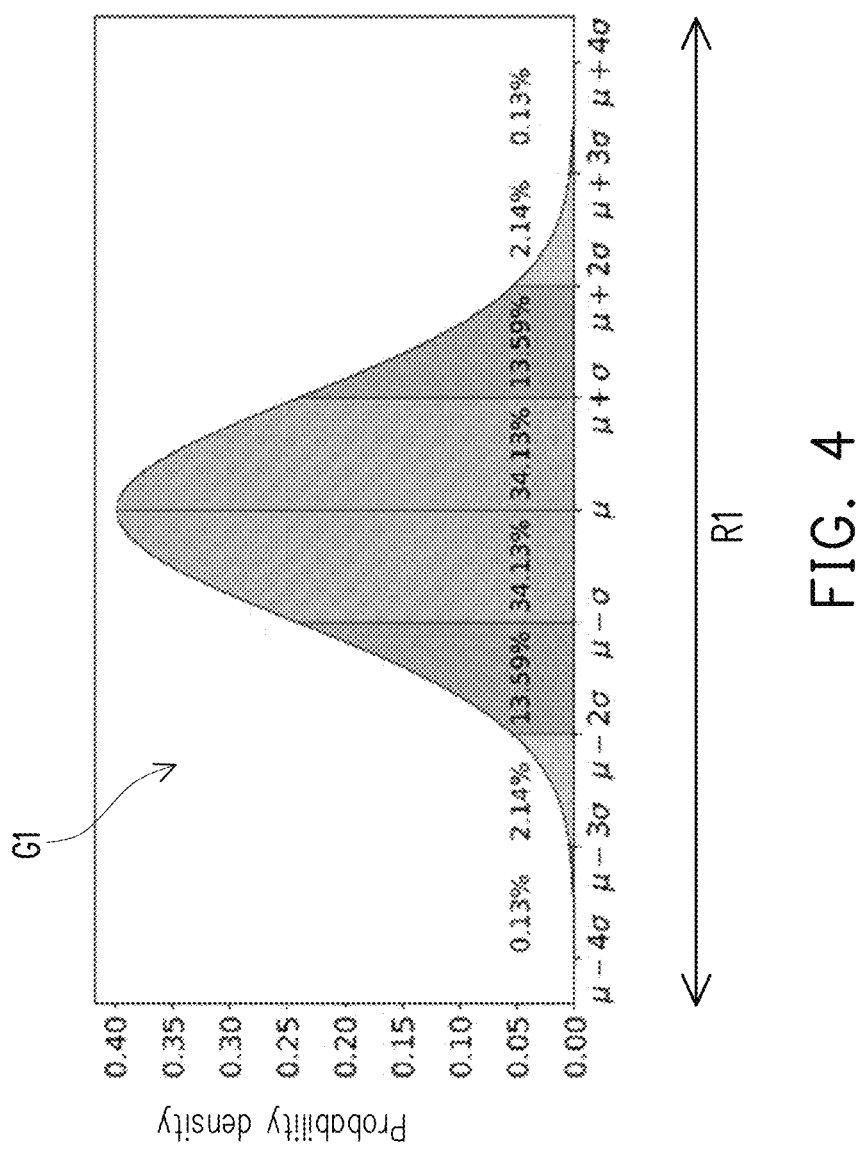
FIG. 4 is a first Gaussian distribution model for modeling a first movable angle range illustrated according to a first embodiment of the disclosure.

Referring to FIG. 4, FIG. 4 is a first Gaussian distribution model for modeling a first movable angle range illustrated according to a first embodiment of the disclosure. In FIG. 4, it is assumed that the first joint point has a first movable angle range R1 in the first dimension, and a first Gaussian distribution model G1 may be used to model the first movable angle range R1, for example. In this case, the processor 104 may sample a first angle within the first movable angle range R1 based on the first Gaussian distribution model G1 to be the first designated joint angle of the first joint point in the first dimension. In one embodiment, the processor 104 may, for example, randomly sample the first angle within the first movable angle range R1 based on the first Gaussian distribution model G1 to be the first designated joint angle described above. In another embodiment, the processor 104 may also directly sample the first angle corresponding to the expected value (i.e., μ) within the first movable angle range R1 to be the first designated joint angle, but not limited thereto.

Similarly, if the processor 104 intends to obtain a designated joint angle of the first joint point in the second dimension, the processor 104 may sample an angle within the another movable angle range based on the another Gaussian distribution model to be another designated joint angle of the first joint point in the second dimension. Based on the teachings above, persons with ordinary skill in the art should be able to understand the manner in which the processor 104 obtains the designated joint angle of each of the joint points in each dimension, and details regarding the same are not repeated herein.

After obtaining the designated joint angles corresponding to the joint points, in step S250, the processor 104 may adjust the joint angle of each of the joint points on the avatar according to the designated joint angles. In the first embodiment, the processor 104 may output the designated joint angles corresponding to the joint points in form of a designated joint angle vector S1 (a dimension thereof is, for example, 159×1). For instance, if the processor 104 samples the angle corresponding to the expected value as the designated joint angle of the joint point for each of the joint points, the processor 104 may directly take the first column of the joint angle distribution matrix M1 as the designated joint angle vector S1, but the disclosure is not limited thereto.

In this case, the processor 104 may, for example, generate a corresponding BVH capture data file based on the designated joint angles in the designated joint angle vector S1, and adjust the joint angle of each of the joint points on the avatar based on the BVH capture data file. For example, the processor 104 may adjust the joint angle of the first joint point in the first dimension to be corresponding to the first designated joint angle (e.g., the expected value of the first Gaussian distribution model G1). Further, the processor 104 may also adjust the joint angle of the first joint point in the second dimension to be corresponding to the another designated joint angle (e.g., the expected value of the another Gaussian distribution model). Accordingly, the processor 104 may adjust the joint angle of each of the joint points on the avatar in different dimensions according to the content of the BVH motion capture data file so that the avatar presents a specific action (e.g., a dance move).

In view of the above, unlike the conventional method of selecting existing dance moves from the database for recombination, the method of the disclosure may be used to determine the joint angle of each of the joint points on the avatar in each dimension according to the current audio signal so that the avatar can conduct dance improvisation on beat based on the current music.

In other embodiments, one single joint point may have two or more movable angle ranges in one single dimension, and these movable angle ranges may be modeled as one multi variate mixture Gaussian model, which will be further described in the second embodiment below.

In the second embodiment, it is assumed that one single joint point has two movable angle ranges in one single dimension, but not limited thereto. In this case, the joint angle distribution matrix M1 may be implemented as a matrix having a dimension of 159×4 in which 159 rows are respectively corresponding to x, y, and z and the (RX, Ry, and Rz) of each of the 52 other joint points described above. With the first joint point taken as an example again, if the first joint point has first and second movable angle ranges in the first dimension (which may be understood as movable angle ranges corresponding to Rx of the first joint point), and the first and second movable angle ranges may be modeled as a first multi variate mixture Gaussian distribution model.

In this case, the row corresponding to Rx of the first joint point in the joint angle distribution matrix M1 may include 4 elements, and these 4 elements may be a first expected value (represented by $\mu_1$), a first standard deviation (represented by $\sigma_1$), a second expected value (represented by $\mu_2$) and a second standard deviation (represented by $\sigma_2$).

Based on the teachings above, persons with ordinary skill in the art should be able to understand the meaning and content of the rest of rows in the joint angle distribution matrix M1 in the second embodiment, and details regarding the same are not repeated herein. Further, in the second embodiment, the first column of the joint angle distribution matrix M1 may be composed of, for example, the first expected value in each row; the second column of the joint angle distribution matrix M1 may be composed of, for example, the first standard deviation in each row; the third column of the joint angle distribution matrix M1 may be composed of, for example, the second expected value in each row; the fourth column of the joint angle distribution matrix M1 may be composed of, for example, the second standard deviation in each row. However, the disclosure is not limited in this regard.

After obtaining the joint angle distribution matrix M1, in step S240, in response to determining that the latent audio feature L1 indicates that the audio signal F1 corresponds to a music, the processor 104 may obtain a plurality of designated joint angles corresponding to the joint points based on the joint angle distribution matrix M1.

With the first joint point taken as an example again, if the processor 104 intends to obtain a first designated joint angle of the first joint point in the first dimension, the processor 104 may sample a first angle within the first movable angle range or the second movable angle range based on the first multi variate mixture Gaussian distribution model to be the first designated joint angle of the first joint point in the first dimension. For ease of understanding, the following description will be supplemented with FIG. 5.

Figure 5:
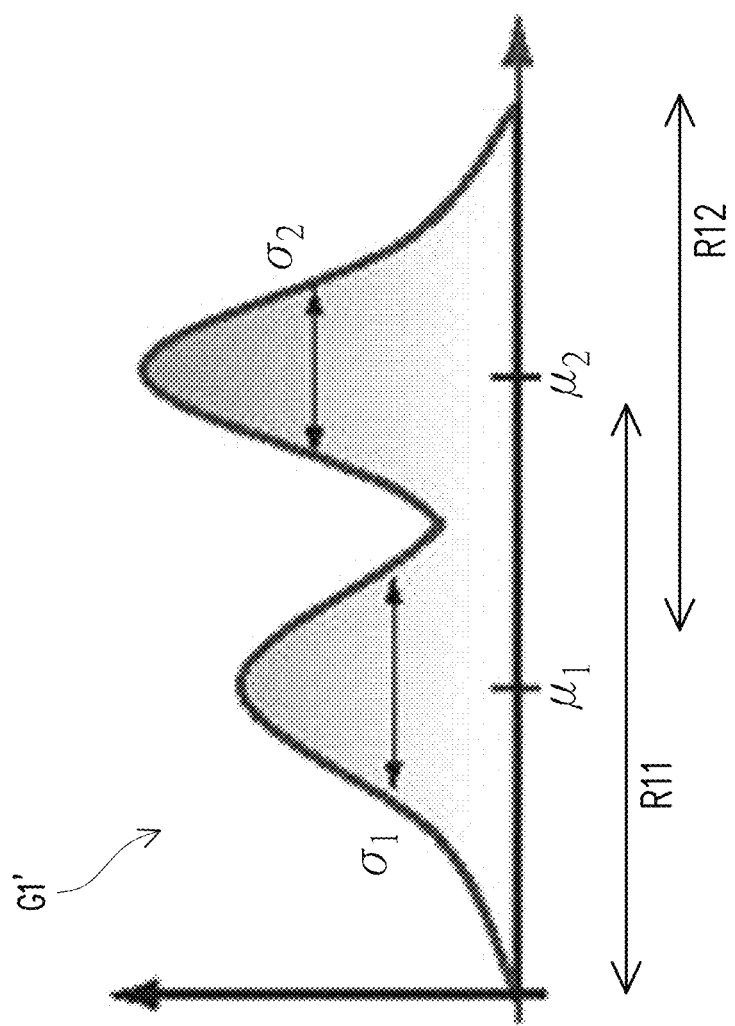
FIG. 5 is a first multi variate mixture Gaussian distribution model for modeling first and second movable angle ranges illustrated according to a second embodiment of the disclosure.

Referring to FIG. 5, FIG. 5 is a first multi variate mixture Gaussian distribution model for modeling first and second movable angle ranges illustrated according to a second embodiment of the disclosure. In FIG. 5, it is assumed that the first joint point has a first movable angle range R11 and a second movable angle range R12 in the first dimension, and the first multi variate mixture Gaussian distribution model G1' may be used to model the first movable angle range R11 (which corresponds to $\mu_1$ and $\sigma_1$) and the second movable angle range R12 (which corresponds to $\mu_2$ and $\sigma_2$), for example. In this case, the processor 104 may sample a first angle within the first movable angle range R11 or the second movable angle range R12 based on the first multi variate mixture Gaussian distribution model G1' to be the first designated joint angle of the first joint point in the first dimension. In one embodiment, the processor 104 may, for example, randomly sample the first angle within the first movable angle range R11 or the second movable angle range R12 based on the first multi variate mixture Gaussian distribution model G1' to be the first designated joint angle described above. In another embodiment, the processor 104 may also directly sample the first angle corresponding to the expected value (i.e., $\mu_1$ or $\mu_2$) within the first movable angle range R11 or the second movable angle range R12 to be the first designated joint angle, but not limited thereto.

In other embodiments, if there are two controllable avatars A and B in an AR/VR environment, and the two avatars A and B each have the first joint point, the processor 104 may sample an angle within the first movable angle range R11 based on the first multi variate mixture Gaussian distribution model G1' to be the first designated joint angle of the first joint point on the avatar A in the first dimension. In addition, the processor 104 may also sample an angle within the second movable angle range R12 based on the first multi variate mixture Gaussian distribution model G1' to be the first designated joint angle of the first joint point on the avatar B in the first dimension. Accordingly, the different avatars may present different dance moves in response to the current music. However, the disclosure is not limited in this regard. Based on the teachings above, persons with ordinary skill in the art should be able to understand the manner in which the processor 104 obtains the designated joint angle of each of the joint points in each dimension in the second embodiment, and details regarding the same are not repeated herein.

Further, the first joint point may also have two movable angle ranges in the second dimension, and these two movable angle ranges may also be modeled as another multi variate mixture Gaussian distribution model. In this case, for the manner in which the processor 104 determines the designated joint angle of the second dimension, reference can be made according to the above teachings, and details regarding the same are not repeated herein. Further, the movable angle ranges of the other joint points in each dimension may also be modeled as corresponding multi variate mixture Gaussian models based on the teachings above, and details regarding the same are not repeated herein since reference can also be made to the above teachings.

After obtaining the designated joint angles corresponding to the joint points, in step S250 of the second embodiment, the processor 104 may adjust the joint angle of each of the joint points on the avatar according to the designated joint angles. In the second embodiment, the processor 104 may output the designated joint angles corresponding to each joint point in form of a designated joint angle vector S1 (a dimension thereof is, for example, 159×1). For instance, if the processor 104 samples the angle corresponding to the first expected value as the designated joint angle of the joint point for each of the joint points, the processor 104 may directly take the first column of the joint angle distribution matrix M1 as the designated joint angle vector S1. As another example, if the processor 104 samples the angle corresponding to the second expected value as the designated joint angle of the joint point for each of the joint points, the processor 104 may directly take the third column of the joint angle distribution matrix M1 as the designated joint angle vector S1, but the disclosure is not limited thereto.

In this case, the processor 104 may, for example, generate a corresponding BVH capture data file based on the designated joint angles in the designated joint angle vector S1, and adjust the joint angle of each of the joint points on the avatar based on the BVH capture data file. For example, the processor 104 may adjust the joint angle of the first joint point in the first dimension to be corresponding to the first designated joint angle (e.g., the first expected value or the second expected value of the first multi variate mixture Gaussian distribution model G1'). Accordingly, the processor 104 may adjust the joint angle of each of the joint points on the avatar in different dimensions according to the content of the BVH motion capture data file so that the avatar presents a specific action (e.g., a dance move).

Figure 6:
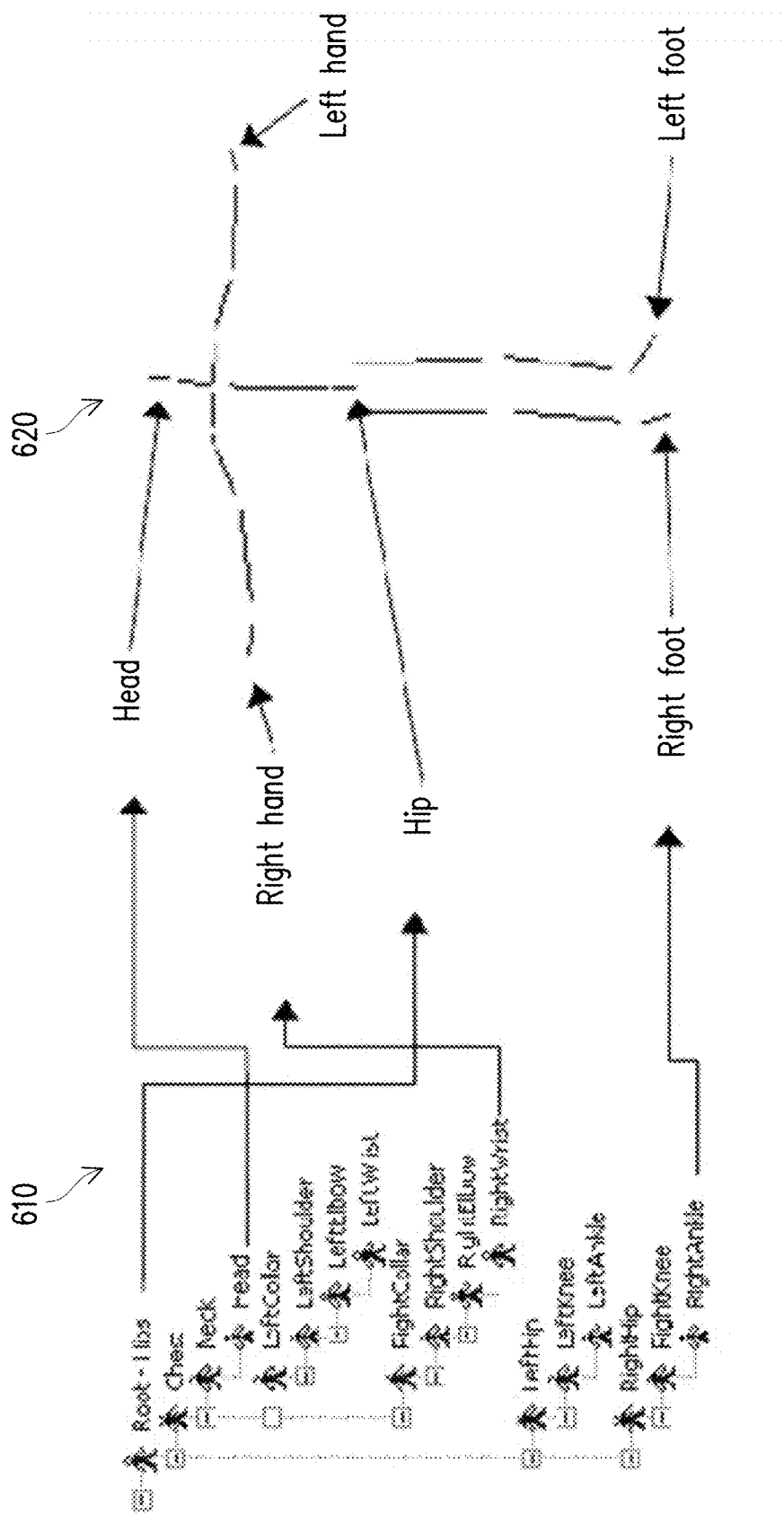
FIG. 6 is a schematic diagram of a BVH motion capture data file and a corresponding avatar illustrated according to one embodiment of the disclosure.

Referring to FIG. 6, FIG. 6 is a schematic diagram of a BVH motion capture data file and a corresponding avatar illustrated according to one embodiment of the disclosure. In this embodiment, based on the above teachings, after the processor 104 generates a BVH motion capture data file 610, according to the content therein, the processor 104 may adjust the joint angle of each of the joint points on an avatar 620. In this way, the avatar 620 may present a specific action, a dance step, a posture or the like. However, the disclosure is not limited in this regard.

It should be understood that it is assumed that the audio signal F1 corresponds to the beat and the music in the foregoing embodiments. For other audio signals not corresponding to the beat or the music, the method of the disclosure may be performed based on different mechanisms, which will be further described below with a third embodiment of the disclosure.

For example, in the third embodiment, it is assumed that the audio signal F2 subsequent to the audio signal F1 corresponds to the music but does not correspond to the beat (i.e., not on beat). In this case, the processor 104 may still perform step S210 to receive the audio signal F2 and extract a high-level audio feature H2 from the audio signal F2. In one embodiment, the processor 104 may input the audio signal F2 (e.g., an audio frame) to the CNN N1 for the CNN N1 to extract the high-level audio feature H2 from the audio signal F2.

Then, in step S220, the processor 104 may extract a latent audio feature L2 from the high-level audio feature H2. In one embodiment, the processor 104 may input the high-level audio feature H2 to the first RNN N2 for the first RNN N2 to extract the latent audio feature L2 from the high-level audio feature H2 based on a first internal state IS11. In this embodiment, since the first internal state IS11 may be understood as an operation from a previous stage, the first internal state IS11 may be regarded as a historical internal state in the third embodiment. In addition, because the first internal state IS11 has related information of the high-level audio feature H1 of the previous stage, the latent audio feature L2 extracted by the first RNN N2 may also take information of the previous stage (or stages) into consideration. However, the disclosure is not limited in this regard.

Further, in this embodiment, besides outputting the latent audio feature L2 based on the high-level audio feature H2, the first RNN N2 may also output a first internal state IS21 for use by the next stage, but not limited thereto.

In the third embodiment, the processor 104 may also input the latent audio feature L2 to the specific neural network N3 for the specific neural network N3 determines whether the audio signal F2 corresponds to the beat or corresponds to the music based on the latent audio feature L2, but not limited thereto.

Since it is already assumed that the audio signal F2 in the third embodiment corresponds to the music but not on beat, the processor 104 may execute step S230 in a manner different from the first and second embodiments to generate a corresponding joint angle distribution matrix M2. Specifically, in the third embodiment, the processor 104 may obtain a historical joint angle distribution matrix. Here, the historical joint angle distribution matrix may include a plurality of historical Gaussian distribution parameters, and the historical Gaussian distribution parameters may correspond to the joint points on the avatar. In the third embodiment, the historical joint angle distribution matrix may be the joint angle distribution matrix M1 generated in the operation of the previous stage, and the historical Gaussian distribution parameters are the content in the joint angle distribution matrix M1. However, the disclosure is not limited in this regard.

Then, the processor 104 may convert the historical joint angle distribution matrix (i.e., the joint angle distribution matrix MD into a reference audio feature L2' and define the reference audio feature L2' as a (new) latent audio feature L2. Then, the processor 104 may input the reference audio feature L2' (i.e., the new latent audio feature L2) to the second RNN N4 for the second RNN N4 to obtain the joint angle distribution matrix M2.

In brief, because the audio signal F2 is not on beat, the processor 104 may ignore the original latent audio feature L2 and use the reference audio feature L2' converted from the joint angle distribution matrix M1 as the (new) latent audio feature L2 to be inputted to the second RNN N4 for the second RNN N4 to accordingly obtain the joint angle distribution matrix M2.

In one embodiment, to convert the dimension of the joint angle distribution matrix M1 into the reference audio feature L2' suitable to be inputted to the second RNN N4, the processor 104 may simply use one fully-connected layer neural network for the conversion. In addition, the processor 104 may perform the conversion based on a convolution layer and a pooling layer, but not limited thereto. For the related principle of feeding the (converted) joint angle distribution matrix M1 to the second RNN N4 to obtain the joint angle distribution matrix M2, reference can be made according to "Auto-Conditioned Recurrent Networks for Extended Complex Human Motion Synthesis, cs.LG, 2017", and details regarding the same are not repeated herein.

Further, in the third embodiment, the second RNN N4 may further generate the joint angle distribution matrix M2 based on the reference audio feature L2' and the second internal state IS12, so as to generate the joint angle distribution matrix M2 better with information of the previous one or many stages taken into consideration. However, the disclosure is not limited in this regard.

After generating the joint angle distribution matrix M2, the processor 104 may, for example, generate the corresponding designated joint angle vector S1 based on the mechanism taught in the first and second embodiments, and adjust the action/dance move/posture of the avatar to a state corresponding to the audio signal F2.

In a fourth embodiment, it is assumed that the audio signal F3 corresponds to the beat and the music, the processor 104 may adjust the action/dance move/posture of the avatar to a state corresponding to the audio signal F3 based on the mechanism taught in the first and second embodiments, and details regarding the same are not repeated herein.

Further, in the fifth embodiment, it is assumed that the specific neural network N3 determines that a latent audio feature (not labelled) of the audio signal indicates that the audio signal FN corresponds neither to the beat nor to the music, the processor 104 does not adjust the joint angle of each of the joint points on the avatar, or adjusts the avatar to present an idle posture. Accordingly, the avatar may be prevented from dancing on its own without any music. However, the disclosure is not limited in this regard.

Figure 7:
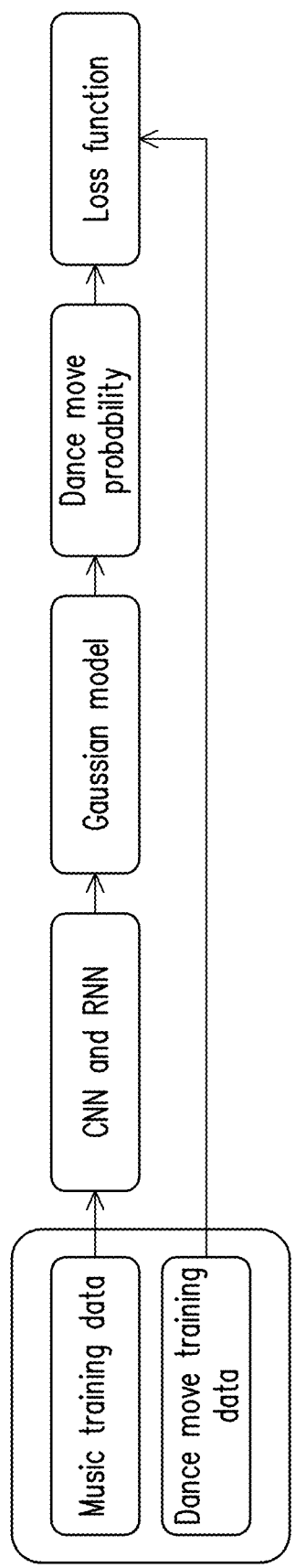
FIG. 7 is a schematic diagram of a training stage illustrated according one embodiment of the disclosure.

Referring to FIG. 7, FIG. 7 is a schematic diagram of a training stage illustrated according one embodiment of the disclosure. In FIG. 7, the training mechanism shown can be used to generate the CNN N1, the first RNN N2, the specific neural network N3 and the second RNN N4 mentioned in the foregoing embodiments. Specifically, in this embodiment, the processor 104 may first input music training data to above-mentioned neural networks to be trained (i.e., the CNN N1, the first RNN N2, the specific neural network N3 and the second RNN N4). In one embodiment, relevant model parameters of each neural network may be initialized to random values, but not limited thereto.

Then, the processor 104 may model corresponding (univariate/multi variate) Gaussian models corresponding to the movable angle range of each joint point on the avatar in each dimension based on dance move training data, and accordingly generate a predicted dance move. Then, the processor 104 may calculate a loss function based on the predicted dance move and corresponding dance move training data, and adjust the relevant model parameters (e.g., weights of neurons) of the neural networks according to a result of the loss function. The above process can be repeatedly executed until the predicted dance move is sufficiently close to the corresponding dance training data. For technical details about training stage, reference can be made to relevant literatures in the related art, and details regarding the same are not repeated herein.

In summary, the method and the electronic device provided by the disclosure can allow the avatar in the AR/VR environment to conduct dance improvisation on the beat based on the current music without maintaining the dance move database. In addition, the method of the disclosure allows the electronic device to use less memory and allows the electronic device to perform related operations in real time. Therefore, even if the electronic device is the edge device with limited resources, the method of the disclosure can still allow the electronic device to smoothly control the avatar to dance with the music.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A method for generating action according to audio signal, comprising:
    receiving a first audio signal and extracting a first high-level audio feature from the first audio signal;
    extracting a first latent audio feature from the first high-level audio feature;
    in response to determining that the first latent audio feature indicates that the first audio signal corresponds to a first beat, obtaining a first joint angle distribution matrix according to the first latent audio feature, wherein the first joint angle distribution matrix comprises a plurality of Gaussian distribution parameters, and the Gaussian distribution parameters correspond to a plurality of joint points on an avatar;
    in response to determining that the first latent audio feature indicates that the first audio signal corresponds to a first music, obtaining a plurality of designated joint angles corresponding to the joint points based on the first joint angle distribution matrix; and
    adjusting a joint angle of each of the joint points on the avatar according to the designated joint angles.

2. The method according to claim 1, wherein the first audio signal comprises a first audio frame, and the step of extracting the first high-level audio feature from the first audio signal comprises:
    inputting the first audio frame to a convolutional neural network for the convolutional neural network to extract the first high-level audio feature from the first audio frame.

3. The method according to claim 1, wherein the step of extracting the first latent audio feature from the first high-level audio feature comprises:
    inputting the first high-level audio feature to a first recurrent neural network for the first recurrent neural network to extract the first latent audio feature from the first high-level audio feature.

4. The method according to claim 1, further comprising:
    inputting the first latent audio feature to a specific neural network for the specific neural network to determine whether the first audio signal corresponds to the first beat based on the first latent audio feature and determine whether the first audio signal corresponds to the first music based on the first latent audio feature.

5. The method according to claim 1, wherein in response to determining that the first latent audio feature indicates that the first audio signal does not correspond to any beat, the method further comprises:
    obtaining a historical joint angle distribution matrix, converting the historical joint angle distribution matrix into a reference audio feature and defining the reference audio feature as the first latent audio feature, wherein the historical joint angle distribution matrix comprises a plurality of historical Gaussian distribution parameters, and the historical Gaussian distribution parameters correspond to the joint points on the avatar; and
    obtaining the first joint angle distribution matrix according to the first latent audio feature.

6. The method according to claim 1, wherein the step of obtaining the first joint angle distribution matrix according to the first latent audio feature comprises:
    inputting the first latent audio feature to a second recurrent neural network so that the second recurrent neural network generates the first joint angle distribution matrix based on the first latent audio feature.

7. The method according to claim 1, wherein the step of extracting the first latent audio feature from the first high-level audio feature comprises:
    obtaining a first historical internal state; and
    inputting the first high-level audio feature to a first recurrent neural network for the first recurrent neural network to extract the first latent audio feature from the first high-level audio feature based on the first historical internal state.

8. The method according to claim 7, wherein the step of obtaining the first historical internal state comprises:
    receiving a first historical audio signal prior to the first audio signal and extracting a first historical high-level audio feature from the first historical audio signal; and
    inputting the first historical high-level audio feature to the first recurrent neural network for the first recurrent neural network to generate the first historical internal state and a first historical latent audio feature corresponding to the first historical high-level audio feature based on the first historical high-level audio feature.

9. The method according to claim 8, wherein the step of obtaining the first joint angle distribution matrix according to the first latent audio feature comprises:
    obtaining a second historical internal state; and
    inputting the first latent audio feature to a second recurrent neural network for the second recurrent neural network to generate the first joint angle distribution matrix based on the second historical internal state and the first latent audio feature.

10. The method according to claim 9, wherein the step of obtaining the second historical internal state comprises:
    inputting the first historical latent audio feature to the second recurrent neural network for the second recurrent neural network to generate the second historical internal state based on the first historical latent audio feature.

11. The method according to claim 1, wherein in response to determining that the first latent audio feature indicates that the first audio signal does not correspond to any music, the method further comprises:

not adjusting the joint angle of each of the joint points on the avatar or adjusting the avatar to present an idle posture.

12. The method according to claim 1, wherein the joint points comprises a first joint point, the first joint point has a first movable angle range in a first dimension, and the Gaussian distribution parameters comprise a first expected value and a first standard deviation, wherein the first expected value and the first standard deviation correspond to a first Gaussian distribution model for modeling the first movable angle range.

13. The method according to claim 12, wherein the designated joint angles comprise a first designated joint angle corresponding to the first joint point in the first dimension, and the step of obtaining the designated joint angles corresponding to the joint points based on the first joint angle distribution matrix comprises:

sampling a first angle within the first movable angle range based on the first Gaussian distribution model to be the first designated joint angle of the first joint point in the first dimension.

14. The method according to claim 13, wherein the first angle is an angle corresponding to the first expected value within the first movable angle range.

15. The method according to claim 13, wherein the step of adjusting the joint angle of each of the joint points on the avatar according to the designated joint angles comprises:

adjusting the joint angle of the first joint point in the first dimension to be corresponding to the first designated joint angle.

16. The method according to claim 1, wherein the joint points comprises a first joint point, the first joint point has a first movable angle range and a second movable angle range in a first dimension, the Gaussian distribution parameters comprise a first expected value, a first standard deviation, a second expected value and a second standard deviation, and the first expected value, the first standard deviation, the second expected value and the second standard deviation correspond to a first multi variate mixture Gaussian distribution model for modeling the first movable angle range and the second movable angle range, wherein the first expected value and the first standard deviation correspond to the first movable angle range, and the second expected value and the second standard deviation correspond to the second movable angle range.

17. The method according to claim 16, wherein the designated joint angles comprise a first designated joint angle corresponding to the first joint point in the first dimension, and the step of obtaining the designated joint angles corresponding to the joint points based on the first joint angle distribution matrix comprises:

sampling a first angle within the first movable angle range or the second movable angle range based on the first multi variate mixture Gaussian distribution model to be the first designated joint angle of the first joint point in the first dimension.

18. The method according to claim 17, wherein the first angle is an angle corresponding to the first expected value within the first movable angle range or an angle corresponding to the second expected value within the second movable angle range.

19. The method according to claim 12, wherein the first joint point has another movable angle range in a second dimension, and the Gaussian distribution parameters comprise another expected value and another standard deviation, wherein the another expected value and the another standard deviation correspond to another multi variate mixture Gaussian distribution model for modeling the another movable angle range, the designated joint angles further comprise another joint angle corresponding to the first joint point in the second dimension, and the method further comprises:

sampling another angle within the another movable angle range based on the another multi variate mixture Gaussian distribution model to be the another joint angle of the first joint point in the second dimension.

20. The method according to claim 19, wherein the another angle corresponds to the another expected value.

21. The method according to claim 19, further comprising:

adjusting the joint angle of the first joint point in the second dimension to be corresponding to the another joint angle.

22. The method according to claim 1, wherein the step of adjusting the joint angle of each of the joint points on the avatar according to the designated joint angles comprises:

generating a biovision hierarchy motion capture data file based on the designated joint angles, and adjusting the joint angle of each of the joint points on the avatar based on the biovision hierarchy motion capture data file.

23. An electronic device, comprising:

a storage circuit, storing a plurality of modules; and a processor, coupled to the storage circuit, and accessing the modules to execute steps of:

receiving a first audio signal and extracting a first high-level audio feature from the first audio signal;

extracting a first latent audio feature from the first high-level audio feature;

in response to determining that the first latent audio feature indicates that the first audio signal corresponds to a first beat, obtaining a first joint angle distribution matrix according to the first latent audio feature, wherein the first joint angle distribution matrix comprises a plurality of Gaussian distribution parameters, and the Gaussian distribution parameters correspond to a plurality of joint points on an avatar;

in response to determining that the first latent audio feature indicates that the first audio signal corresponds to a first music, obtaining a plurality of designated joint angles corresponding to the joint points based on the first joint angle distribution matrix; and adjusting a joint angle of each of the joint points on the avatar according to the designated joint angles.

* * * * *